United States Patent [19]
Dochterman et al.

[11] 3,746,894

[45] July 17, 1973

[54] DYNAMOELECTRIC MACHINE VIBRATION ISOLATION MOUNTING ARRANGEMENT

[75] Inventors: Richard W. Dochterman; David H. Yeaman, Jr., both of Fort Wayne, Ind.

[73] Assignee: General Electric Company, Ft. Wayne, Ind.

[22] Filed: Aug. 4, 1971

[21] Appl. No.: 168,960

[52] U.S. Cl. ............... 310/51, 248/15, 417/363
[51] Int. Cl. ............................................. H02k 5/24
[58] Field of Search ................... 310/51, 85, 91, 89; 417/363, 423 A; 248/15, 26; 181/33 K

[56] References Cited
UNITED STATES PATENTS

| | | | |
|---|---|---|---|
| 3,154,704 | 10/1964 | Shaffer | 310/51 |
| 2,915,265 | 12/1959 | Tiger | 417/363 |
| 2,923,460 | 2/1960 | Galaba | 417/363 |
| 2,832,554 | 4/1958 | Reisch | 248/26 |
| 2,838,262 | 6/1958 | Anderson | 248/26 |
| 3,114,060 | 12/1963 | Goettl | 310/51 |

*Primary Examiner*—R. Skudy
*Attorney*—John M. Stoudt et al.

[57] ABSTRACT

Electric motor supported on a blower housing so as to withstand shipping shock and other impact loads, so as to isolate torque pulsation vibrations from the blower. Motor mounting arrangement may include rigid members secured to the motor, resilient vibration isolator supported by a rigid member, and a pair of interlocking clamping arms for compressing the vibration isolator. At least one clamping arm may be braced by the housing so as to enhance the strength or rigidity of the arrangement.

5 Claims, 4 Drawing Figures

Patented July 17, 1973

3,746,894

INVENTORS:
Richard W. Dochterman,
David H. Yeaman, Jr,
BY Ralph E. Krisher Jr.
ATTORNEY.

though by itself does not constitute any part of our present invention.

DYNAMOELECTRIC MACHINE VIBRATION ISOLATION MOUNTING ARRANGEMENT

BACKGROUND OF THE INVENTION

This invention relates to an improved dynamoelectric machine mounting arrangement and more particularly to an improved vibration isolation mounting construction for a motor that remains undamaged when subjected to expected impact loading conditions and yet provides satisfactory vibration isolation between a motor and motor supporting structure during motor operation.

As recognized, for example, by Staak U.S. Pat. No. 2,936,947 and Shaffer U.S. Pat. No. 3,154,704 (both assigned to the assignee of the present application), in different applications it is desirable to utilize a vibration isolation mounting means in order to inhibit the transmission of vibrations or noise from the motor to the apparatus driven by the motor or structure on which the motor is supported.

In applications where a motor is supported directly by a housing or frame of an air moving means, such as a blower housing as illustrated in the Staak patent, vibrations transmitted to such housing may tend to be intensified both by the housing and air conveying ductwork in communication therewith. It will therefore be understood that especially in central heating or cooling air moving systems, it would be particularly desirable to isolate vibrations originated by motor operation from such systems. One example of such vibrations are the twice line frequency torque pulsations that occur during operation of a single phase induction motor.

However, it is at least equally important that the vibration isolation means utilized be sufficiently rigid to withstand damage to the motor mounting arrangement that might result from expected impact load conditions. Impact load conditions often are encountered during shipment and handling of blower housings with motors mounted thereto, and occur, for example when the housing and motor units are dropped on loading docks or trucks and even while such units are in transit.

These conditions are at times referred to as "shipping shock." Heretofore, different types of motor vibration isolation members have been suggested for use in such diverse applications as vacuum cleaners, air conditioner or refrigerator condenser fan mounting systems, and central air moving systems. One of the desirable approaches used heretofore from the standpoint of vibration isolation has utilized a dumbbell shaped member formed from an elastic soft rubber material, e.g., neoprene rubber having a Shore A scale hardness of about 57.

While it is desirable to provide a vibration isolation mounting arrangement for a motor and blower housing that will withstand shipping shock as just stated, it is also desirable, if not necessary, to provide a sufficiently stiff or rigid mounting arrangement to constrain movement of a motor relative to the motor mounting surfaces. For example, when arrangements are provided where a motor is suspended from a blower housing and a fan within such housing is supported by the motor shaft, the mounting arrangement should be sufficiently rigid to prevent the fan from striking the housing during operation.

In addition, the vibration isolation motor mounting means should be economical to manufacture and assemble, both during assembly of new units and during replacement of a motor in the field.

It is, therefore, a general object of the present invention to provide an improved vibration isolation motor mounting arrangement that includes the desirable features described above.

Another object is to provide an improved motor mounting arrangement which is arranged to utilize the motor mounting surface as a means for assisting the arrangement in withstanding shipping shock.

Still another object of the present invention is to provide an improved vibration isolation motor mounting arrangement utilizing a vibration isolating elastic member.

SUMMARY OF THE INVENTION

In carrying out the objects of the invention in one form, we provide an improved arrangement for supporting an electric motor on a blower housing so as to withstand impact loads such as shipping shock, so that vibrations associated with motor operation will be isolated from the blower, and so that a fan may be suspended and driven from the motor shaft within the housing. In one exemplification, there is included motor mounting means that are, at the same time: mechanically strong, resilient or soft, and stiff; with respect to different types of relative movement between the parts thereof. In an illustrated form, the mounting means include a plurality of rigid members secured to the motor, a resilient vibration isolator supported by each rigid member, and a pair of interlocking clamping arms that may be readily assembled to clamp against and compress the vibration isolator and that may be secured to a blower housing. At least one of the arms is contoured and arranged to be braced by the housing so as to enhance the strength or rigidity of the arrangement.

The subject matter which we regard as our invention is set forth in the appended claims. The invention itself, however, together with further objects and advantages thereof may be better understood by referring to the following more detailed description taken in conjunction with the drawing.

DESCRIPTION OF THE PREFERRED EMBODIMENT

Figure 1:
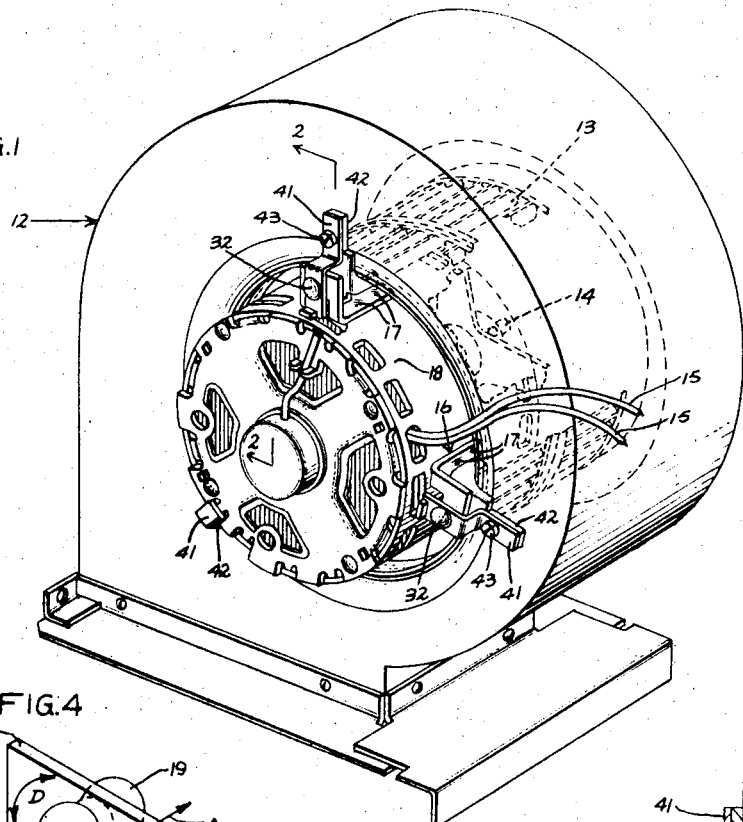
FIG. 1 illustrates our invention in one form and is a perspective view of an electric motor supported on a blower housing, with the motor supporting a blower wheel or fan.

Referring now to the drawing in more detail, numeral 10 identifies a commercially available single phase induction motor, e.g., a four or six-pole shaded pole motor, suitable for use in air moving applications. The motor 10 is supported by the scroll side 11 of a blower housing 12 so that the transmission of vibrations from the motor to the housing will be damped during motor operation. The motor is also mounted to the housing with sufficient rigidity to restrain a conventional blower wheel 13 supported on the shaft 14 from striking the housing during operation of the motor 10 when the leads 15 of the motor are connected to a conventional source of alternating voltage.

As will be understood, during operation of the motor 10, torque pulsations will occur with a frequency of about twice the frequency of the power supplied to the motor. Thus, in 50 Hz and 60 Hz applications, torque pulsations at a frequency of about 100 Hz and 120Hz respectively, will occur. These pulsations in turn can result in objectionable 100 or 120 Hz vibrations being transmitted to the housing 12 and the generation of noise that would be heard in the ductwork connected to the outlet side of the housing 12.

Figure 4:
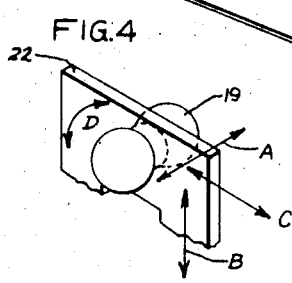
FIG. 4 is a detailed view of parts of the structure, illustrated in FIG. 3.
Figure 3:
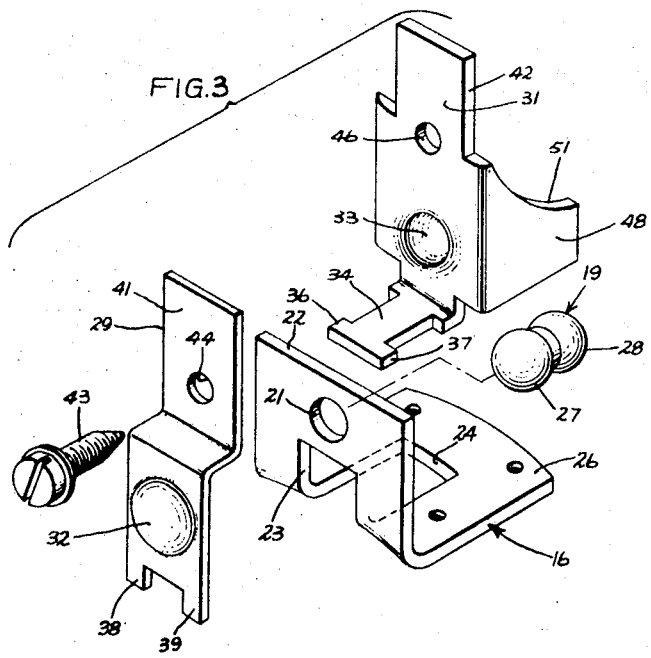
FIG. 3 is an exploded perspective view of the means for mounting the motor to the blower housing revealed in FIG. 1.
Figure 2:
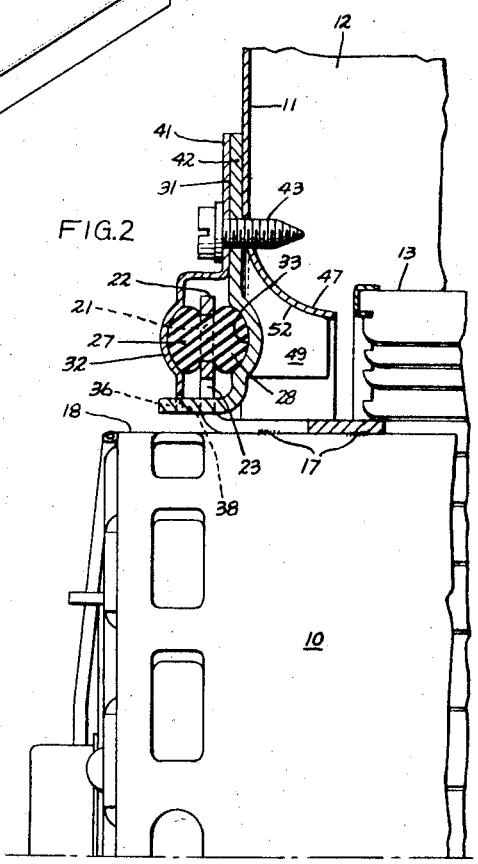
FIG. 2 is a view taken generally in the direction of the arrows 2—2 in FIG. 1, with parts in section and parts broken away.

An improved mounting arrangement that results in dampening the transmission of vibrations from the motor to the housing and yet is sufficiently strong to withstand shipping shock and sufficiently rigid to prevent interference between the housing 12 and wheel 13 will be best appreciated by now referring to FIGS. 2-4 in conjunction with FIG. 1.

As will be best appreciated from FIGS. 1-3, the illustrated mounting means includes rigid mounting members 16 secured, e.g., by spot welds 17, at three or more circumferentially spaced apart locations to the shell or housing 18 of the motor 10.

The mounting means also include elastic dumbbell shaped vibration isolation members 19 that are assembled with the members 19 by placement in holes 21 formed in a leg 22 of the members 16. As best revealed in FIG. 3, an opening or slot 23 is formed in the leg 22 and, for ease of fabrication, the slot 23 may communicate with a slot 24 in the leg 26 of member 16.

As will be appreciated from an inspection of FIG. 2, when the legs 26 of members are secured to the motor shell 18 as shown, the legs 22 extend radially outward relative to the center or shaft of the motor 10.

Since it is desirable to support the wheel 13 in a centered relationship to the housing 12 and to prevent movement of the wheel 13 both axially and radially relative to the housing, it will be understood that the mounting arrangement for the cantilever supported motor 10 must be relatively stiff in both radial and axial directions.

With this in mind, reference is now made to FIG. 4 wherein a portion of leg 22 and member 19 is shown along with arrows A, B, C, D that will be referred to in describing undesirable movement of the motor 10 relative to the housing 12 and to also describe some of the modes of vibration of the motor 10 during operation thereof.

The arrows A and B represent the lines of axial and radial movement of the motor 10 that would not be desirable for the above stated reasons. The arrows C and D, on the other hand, indicate the tangential or rotary movement of the motor 10 that tends to occur due to torque pulsations during motor operation that occur as previously discussed.

As will now be described, it is desirable for the mounting arrangement, including the vibration isolation member 19, to restrain motor movement along the lines of arrows A and B and to permit oscillating or pulsating movement of the motor 10 and leg 22 along the lines of arrows C and D as shown in FIG. 4.

We have confirmed that, by clamping and compressing the ends 27, 28 of member 19 between a pair of arms and also securing the arms to the housing 12, the motor 10 may be supported with sufficient rigidity to avoid undesirable axial and radial movement of the motor. Thus, the member 19 forms part of a rigid mounting arrangement for the motor 10 in axial and radial directions relative to the motor axis.

On the other hand, the elastic member 19, even after being compressed, forms part of a resilient vibration isolation mounting arrangement for the motor 10 in the direction of torque pulsations of the motor.

Means by which the elastic member 19 may be expeditiously and economically clamped or compressed include a pair of interlocking arms 29, 31. These arms are provided with seats or retainers 32, 33, respectively arranged to accommodate the ends 27, 28 of the member 19.

In the assembly of the illustrated arrangement, the member 19 is first positioned in the hole 21 in leg 22 of a member 16 that has been previously fastened to the motor shell 18. Then, the arms are positioned to trap the member 19 between the seats 32, 33 thereof, with an extension, such as extension 34 of arm 31 passing through the slot 23 in leg 22. Ears 36, 37 on extension 34 then interfit and interlock with tabs or ears 38, 39 formed on the clamping arm 29. Then, as the extremities 41, 42 of clamping parts 29, 31 are drawn together (for example, as occurs when the motor 10 is secured to the housing 12 with a fastener 43), the ears and tabs 36, 37, 38, 39 bear against one another and the member 19 is compressed between the seats 32, 33. Although the fastener 43 has been shown as a conventional self-tapping sheet metal screw, received by apertures 44, 46, it will also be understood that other types of fasteners could be utilized. Furthermore, the extremities 41, 42 may be held together with suitable means other than such fastener.

With particular reference now to FIGS. 2 and 3, it will be understood from the following description, that we have devised a mounting arrangement that also withstands shipping shock by utilizing the venturi ring or curved annular flange 47 to assist the clamp 31 in imparting satisfactory structural integrity or rigidity to the mounting arrangement. For example, we have provided mounting arrangement stiffeners in the form of a pair of arms 48, 49 on the clamping part 31, the arms 48, 49 being contoured, e.g., radiused, as shown at 51, 52 in order to attain suitable support for the motor 10 and, more particularly, the shell 18 of the stator of the motor. Furthermore, by providing two separate clamping parts 29, 31, increased structural integrity may also be attained by utilizing relatively thick or heavy material in the fabrication of the clamping part 31 as compared to part 29. Thus, more rigid material or, as illustrated, more rigid sections of material may be utilized for those parts of the mounting arrangement that tend to be most adversely affected by "shipping shock."

For purposes of completeness of description, and not by way of limitation, the parts 16, 29, and 31 were fabricated in one exemplification, from zinc plated cold rolled steel, with 0.094 inch thick stock being utilized for parts 16 and 31, and 0.045 inch thick stock being utilized in the fabrication of part 29. The vibration isolation member, on the other hand, was molded from neoprene rubber having a hardness of Shore A 57. Furthermore, the shaft 14 of the motor 10 is supported in bearings as will be understood. The actual details of construction of the motor 10 may, of course, be varied and the component parts of the motor such as bearings, end frames, and so forth may be as described for example in the above referenced Staak or Shaffer patents, the entire disclosure of which are specifically incorporated herein by reference.

From the foregoing, it will be appreciated that we have provided a new and improved vibration isolation motor mounting arrangement that is also both rigid in predetermined directions of motor movement while also having sufficient structural integrity to withstand "shipping shock."

Therefore, it should be apparent to those skilled in the art, that while we have shown and described what at present is considered to be a preferred embodiment of our invention in accordance with the Patent Statutes, changes may be made in the arrangement and structures disclosed without actually departing from the true spirit and scope of our invention.

What we claim as new and desire to secure by Letters Patent of the United States is:

1. A vibration isolation motor mounting arrangement for an electric motor having a longitudinally extending shaft and a stator shell adapted to be supported by a curved mounting surface, the arrangement comprising: at least one vibration isolation assembly including a supporting member secured to the stator shell and having at least one portion thereof extending radially outwardly; a vibration isolation member carried by the at least one portion of the supporting member and having a pair of longitudinally spaced apart compressible sections; a mounting member having a curved region for mounting to the curved surface and being engageable with the isolation member, said mounting member having a first clamping arm; and a second clamping arm; the first and second clamping arms interlocking with one another and each having a seat for engaging and clamping the compressible sections of the isolation member, so that the isolation member restrains relative longitudinal and radial movement between at least one of the clamping arms and the supporting member thereby to provide resistance to impact loads applied to the arrangement and resistance to longitudinal and radial movement of the motor during operation, the isolation member permitting relative movement between at least one of the clamping arms and supporting member during motor operation as motor torque pulsations occur thereby to isolate torque pulsation vibrations from the mounting surface.

2. A vibration isolation motor mounting arrangement for an electric motor having a longitudinally extending shaft and a shell adapted to be supported by a blower housing adjacent an inlet opening having a curved opening defining surface, the arrangement comprising: at least one vibration isolation assembly including a supporting member secured to the shell, a vibration isolation member accommodated by the supporting member, and a mounting member engageable with the isolation member, said mounting member including a stiffener arm having a curved region for mounting the stiffener arm to the curved surface of the blower housing so that the arm can nest against the curved surface with the stiffener arm providing structural rigidity to the mounting arrangement thereby to provide resistance to deformation caused by impact loads applied thereto; said supporting member including at least one portion extending radially outwardly away from the motor shaft; the vibration isolation member being a compressible member carried by the at least one portion of the supporting member, and including a pair of longitudinally spaced apart compressible sections; said mounting member comprising a first clamping arm; and the arrangement further including a second clamping arm arranged to interlock with the first clamping arm, each of the clamping arms having a seat for engaging and clamping the compressible sections of the isolation member so that the isolation member restrains relative longitudinal and radial movement between the mounting member and the supporting member thereby to provide resistance to impact loads applied to the arrangement and resistance to longitudinal and radial movement of the motor during operation; the isolation member permitting relative movement between at least the mounting member and supporting member during motor operation as torque pulsations occur thereby to provide isolation of motor torque pulsation vibrations from the mounting surface.

3. The arrangement of claim 2 wherein the isolation member comprises a dumbbell shaped member accommodated in an aperture in the supporting member.

4. The arrangement of claim 2 wherein the first and second clamping arms each include at least one ear, the ears of the first and second clamping arms interfitting to lock the arms together.

5. The arrangement of claim 2 wherein the supporting member defines a slot between a free extremity thereof and the shell, and the mounting member includes an extension disposed in the slot.

* * * * *